3,070,509
Patented Dec. 25, 1962

3,070,509
PROCESS FOR COATING MEDICAMENTS
Theodor Völker and Franz Wenzel, Darmstadt, Germany, assignors to Rohm & Haas G.m.b.H., Darmstadt, Germany
No Drawing. Filed Dec. 15, 1959, Ser. No. 859,559
Claims priority, application Germany Dec. 18, 1958
11 Claims. (Cl. 167—82)

This invention relates to a process for coating medicaments, and relates in particular to a process for coating medicaments with a substance dissolving in the stomach.

Heretofore, medicaments having a disagreeable taste have often been provided with a sugar coating which dissolves in the stomach. However, the coating of dragees with sugar is a time-consuming process requiring several days for its completion. Attempts to substitute for sugar coatings a synthetic material which will quickly dissolve in acid stomach juices have heretofore been unsatisfactory.

It has now been found that copolymers comprising 20–80 percent of an amino ester of a polymerizable olefinic carboxylic acid and 80–20 percent of a comonomer which alone homopolymerizes to give a water-insoluble polymer are surprisingly adaptable to use as acid-soluble coatings for tablets, pills and the like. These novel coatings are distinguishable from alkaline-soluble coating materials previously used for protecting acid-sensitive medicaments against stomach secretions. These coatings of the prior art are insoluble in the stomach, and first dissolve in the intestine.

As exemplary of esters of an amino alcohol and of a polymerizable olefinic carboxylic acid, the esters of acrylic acid and methacrylic acid with a primary, secondary or tertiary amino alcohol can be mentioned. Tertiary amino alcohols such as N-dimethyl-aminomethanol, N-dimethyl-beta-aminoethanol, N-diethyl-beta-aminoethanol, N-dimethyl-aminopropanol, and beta-oxy-N-ethyl morpholine give particularly good results.

As comonomers which alone homopolymerize to water-insoluble materials, but which can be copolymerized with the above-mentioned polymerizable amino alcohol esters to give acid-soluble products, can be mentioned the esters of acrylic and methacrylic acid, particularly the lower alkyl esters of these acids, for example, ethyl acrylate, methyl methacrylate, butyl methacrylate, hexyl methacrylate, decyl methacrylate, as well as such monomers as styrene, acrylonitrile, and vinyl acetate.

In view of the numerous possibilities for the components of the coatings, properties of the coatings, such as their rate of solution in the stomach, their mechanical properties, and their behavior with respect to the medicament being coated, can be tailored to specific uses. In addition, the coating compositions may comprise softening agents, flavoring materials, or other additives commonly used in the art.

The coating substances prepared according to the process of the invention have the common property that, on the one hand, they will adhere to the nucleus being coated and yet, on the other hand, they will not cause tablets coated with the materials to adhere to each other, for example, during processing in a coating vessel. Therefore, the use of powder or other separating agents is not necessary in the practice of the present invention.

Further, the materials of the invention, in contrast with sugar-based coatings or other polymer coatings which contain carboxyl groups and which are used in the art for the preparation of coatings which are resistant to dissolving in the stomach, are not hygroscopic. The materials are acid-soluble, and dissolve at the pH found in the stomach, which may range from pH 2 to pH 6.

The coatings prepared according to the process of the present invention are exceedingly elastic and do not tear or crack under mechanical stress. In addition, they are resistant to abrasion. The coatings are completely tasteless and odorless, and can easily be colored using in soluble dyes in the polymer solutions, or can be colored by supplementary treatment after coating.

The copolymers described are prepared with special advantage by polymerizing them in an organic solvent which dissolves both the monomers and the polymers. Volatile aliphatic solvents, for example ethyl alcohol, isopropyl alcohol, acetone, etc., or mixtures of the like are commonly used. The polymerization is usually carried out under the influence of a peroxide-free free radical initiator such as azodiisobutyronitrile. The monomer concentration of the solution is preferably such that a solution containing about 50 percent solids results. This solution can be suitably diluted to make it adaptable to whichever coating method may be employed, for example spray coating or dip coating, both of which are common in the art.

The practice of the invention is illustrated by the following examples.

*Example 1*

80 parts by weight of dimethylaminoethyl methacrylate and 20 parts by weight of methyl methacrylate were copolymerized in 100 parts by weight of isopropanol with 0.5 part by weight of azodiisobutyronitrile, by warming the solution to a temperature between 60° and 70° C. After 24 hours, the resulting solution was diluted with isopropanol to have a solids content of about 25 percent. A small amount (0.2 percent) of the azo catalyst was added, and the solution again warmed for another 24 hours to remove the last traces of unpolymerized monomer.

The solution was again diluted to give a solids content between 10 percent and 15 percent, and applied to tablets to be coated. The application proceeded in a tilted coating kettle rotating at from 20–40 revolutions per minute. The polymer solution was introduced into the rotating kettle over the tablets to be coated, and the kettle rotated for about 1½ hours at a maximum temperature of 60° C.

*Example 2*

Tablets were coated according to the method of Example 1, but employing a polymer comprising 50 parts by weight of dimethylaminopropyl methacrylate, 30 parts by weight of ethyl methacrylate, and 20 parts by weight of methyl acrylate, prepared as in Example 1.

*Example 3*

Following the procedures of Example 1, tablets were coated with a copolymer of 20 parts by weight of dimethylaminomethyl methacrylate, 30 parts by weight of diethylaminoethyl acrylate, 40 parts by weight of methyl methacrylate, and 10 parts by weight of styrene.

*Example 4*

60 parts by weight of diethylaminoethyl methacrylate, 30 parts by weight of methyl methacrylate and 10 parts by weight of vinyl acetate were polymerized as in Example 1, but using ethyl alcohol as a solvent. The copolymer was used in tablet coating, as in Example 1.

*Example 5*

In acetone as a solvent, 20 parts by weight of dimethylaminobutyl methacrylate, 55 parts by weight of methyl methacrylate, 20 parts by weight of propyl acrylate and 5 parts by weight of acrylonitrile were copolymerized and used to coat tablets, as in Example 1. The polymer solution was introduced into the coating kettle by spraying.

What is claimed is:

1. The method of making medicaments covered with an acid-soluble coating, which comprises coating said medicaments with a copolymer comprising 20–80 percent of an ester formed between an aliphatic amino alcohol and a polymerizable olefinic carboxylic acid and 80–20 percent of a comonomer which alone polymerizes to a water-insoluble polymer, said comonomer being selected from the group consisting of acrylic acid esters, methacrylic acid esters, styrene, vinyl acetate, and acrylonitrile.

2. The method of making medicaments covered with an acid-soluble coating, which comprises coating said medicaments with a copolymer comprising 20–80 percent of an ester formed between an aliphatic amino alcohol and of an acid selected from the group consisting of acrylic acid and methacrylic acid, and 80–20 percent of a comonomer selected from the group consisting of acrylic acid esters, methacrylic acid esters, styrene, vinyl acetate, and acrylonitrile.

3. In the method of making medicaments covered with acid-soluble coatings, the step which comprises contacting said medicaments with a solution of a copolymer in a volatile organic solvent, said copolymer comprising 20–80 percent of an ester formed between an aliphatic amino alcohol and of an acid selected from the group consisting of acrylic acid and methacrylic acid, and 80–20 percent of a comonomer selected from the group consisting of acrylic acid esters, methacrylic acid esters, styrene, vinyl acetate, and acrylonitrile.

4. The method as in claim 3, wherein said ester is an ester of methacrylic acid.

5. The method as in claim 3, wherein said ester is an ester of acrylic acid.

6. The method as in claim 3, wherein said ester is dimethylaminoethyl methacrylate.

7. The method as in claim 3, wherein said comonomer is an ester of methacrylic acid.

8. The method as in claim 3 wherein said comonomer is butyl methacrylate.

9. The method as in claim 3 wherein said copolymer comprises about equal parts by weight of said ester and said comonomer.

10. An ingestible coated solid medicament having as the coating an acid soluble copolymer comprising 20–80 percent of an ester formed between an aliphatic amino alcohol and a polymerizable olefinic carboxylic acid and 80–20 percent of a comonomer selected from the group consisting of acrylic acid esters, methacrylic acid esters, styrene, vinyl acetate, and acrylonitrile.

11. A coated medicament as in claim 10 wherein said carboxylic acid is selected from the group consisting of acrylic acid and methacrylic acid.

References Cited in the file of this patent

UNITED STATES PATENTS

| | | |
|---|---|---|
| 2,138,763 | Graves | Nov. 29, 1938 |
| 2,881,085 | Endicott | Apr. 7, 1959 |
| 2,976,214 | Ida | Mar. 21, 1961 |
| 2,987,445 | Levesque | June 6, 1961 |